April 29, 1924.
R. E. KLAGES
DRAG LINK
Filed March 18, 1922
1,492,376
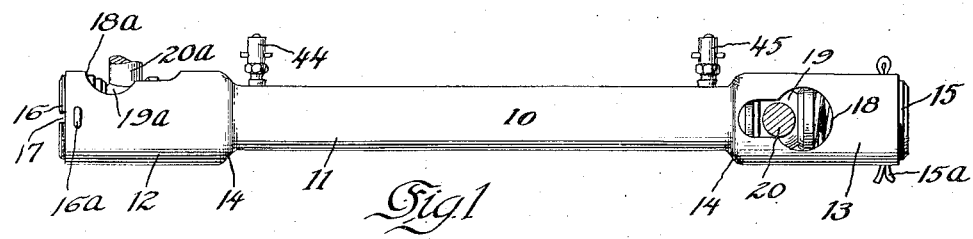
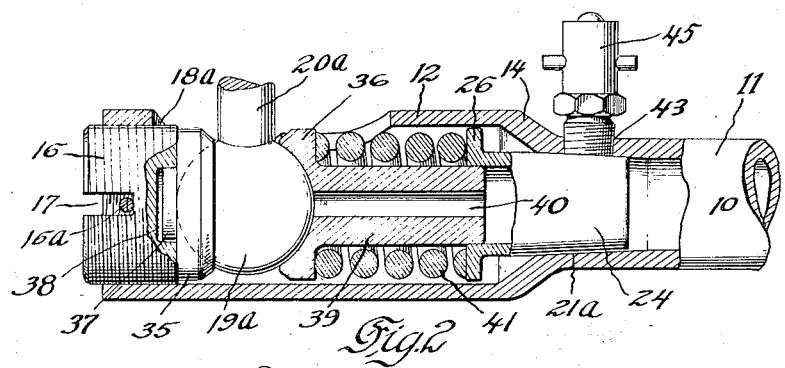
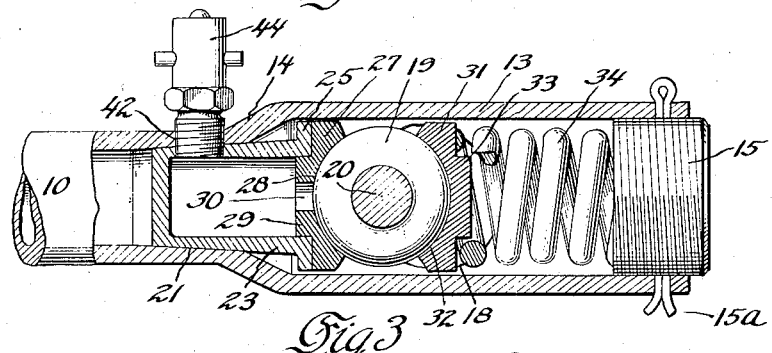
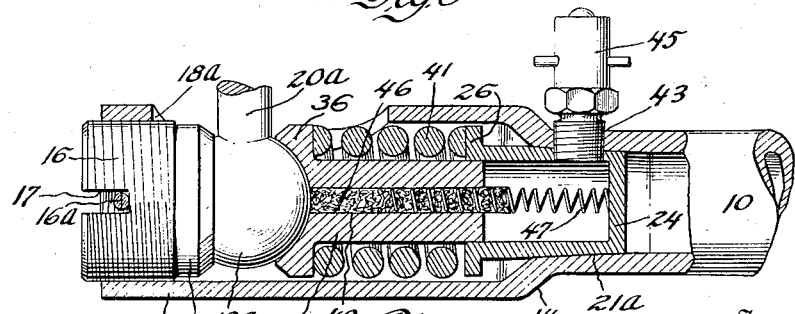
Witness:- J. Wates.
Inventor
Reynold E. Klages.
By his Attorney
Lloyd Blackmore Patented Apr. 29, 1924.

1,492,376

UNITED STATES PATENT OFFICE.

REYNOLD E. KLAGES, OF COLUMBUS, OHIO.

DRAG LINK.

Application filed March 18, 1922. Serial No. 544,828.

*To all whom it may concern:*

Be it known that I, REYNOLD E. KLAGES, a citizen of the United States, and a resident of the city of Columbus, county of Franklin, and State of Ohio, have invented certain new and useful Improvements in Drag Links, of which the following is a full, clear, concise, and exact description, such as will enable others skilled in the art to which the invention relates to make and use the same, reference being made therein to the accompanying drawings, which form a part of this specification.

This invention relates to connecting links and means for lubricating the joints associated therewith.

One of the objects of the invention is the provision of a connecting link that is cheap to manufacture, easily assembled, efficient and reliable in operation, and one that is not likely to get out of order or become distorted, bent or broken while in use.

Another object of the invention is the provision of new and improved means for direct lubrication of ball and socket joints and similar pivotal connections, especially those employed on drag links and similar connecting or tie rods.

A still further object of the invention is the provision of a lubricant receptacle for the joints of drag links and similar devices together with a novel manner of attaching the grease cups thereto.

Other and further objects and advantages of the invention will appear as the description proceeds.

For convenience of description and simplicity in illustration the invention is disclosed as being embodied in a drag link for automobiles. It is understood, however, that its use is not so limited, as the link may be used for other purposes, and the lubricating features are capable of use in connection with joints of different types employed in various other relations.

Figure 1 is a plan view of a drag link;

Figure 2 is a sectional view of the left hand end thereof, parts broken away;

Figure 3 is a sectional view of the right hand end of the link shown in Figure 1, with parts broken away; and Figure 4 is a sectional detail of a modified form of lubricating device.

On the drawing, the reference numeral 10 designates a connecting link, having the body portion 11 and the enlarged ends 12 and 13 integrally connected thereto by the connecting portions or shoulders 14. The thickness of the walls of the body portion is greater than that of the ends, but less than that of the shoulder portions.

Observation and experience indicate that that portion of a drag link that is most likely to break is that part that connects the body portion to the enlarged ends as at the shoulders 14. This is probably due to ruptures in the material due to bending the same in forming the link, and also to the fact that the strain or force exerted on the link at this point, while it is in use, is at an angle to the grain of the metal. In order to overcome the tendency to break at this point, the thickness of the wall at the shoulder is preferably made greater than that of the body portion. The thickness of the walls of the enlarged ends may be less than that of the body portion since the increase in the diameter of the enlarged ends will permit the walls to be made thinner without decreasing the strength of these portions of the link.

The enlarged ends 12 and 13 are each internally threaded at their outer ends to receive the threaded plugs 15 and 16 held in adjusted position by cotter pins 15ª and 16ª engaging the slots 17 in the ends thereof. These enlarged ends are also provided with the usual key-hole openings 18, 18ª having the enlarged portion for the reception of the ball or spherical ends 19, 19ª of the arms or links 20, 20ª of the steering mechanism. These openings may be arranged at an angle from each other about the circumference of the link as is common in such constructions.

The tubular link is provided adjacent each end thereof with a closure whereby a lubricant pocket or reservoir is formed. The link is also provided adjacent the ends thereof with an abutment member. Where these two devices are both employed together they may be combined in a single element as shown on the drawings, wherein the abutment members 23 and 24 are provided with lubricant reservoirs. The members 23 and 24 may be rigidly secured to the body portion of the link in any suitable or well known manner. As shown, the openings in the ends of the body portion are slightly tapered as at 21 and 21ª into which the corresponding tapered inner ends of the abutment or reservoir members are adapted to be secured by pressure or in any other suitable manner. These members have their reservoirs opening outwardly and are provided at their outer ends with the flanges 25 and 26 against which the ball holding devices are adapted to engage.

The abutment or reservoir members are so arranged that substantially all the shocks incident to the operation of the device are transferred directly to the body portion of the link, thus eliminating almost entirely all compression strains on the shoulders 14. This is an important feature of the invention, because it materially decreases the forces and strains that otherwise would act directly on the shoulders 14 tending to break or rupture the same. Moreover, the distance between the abutments may be more easily determined and more accurately made than where the shoulders themselves are employed as abutment members.

A socket block 27 is employed in the enlargement at one end of the link, see Figure 3. This socket block is provided on one side with a concave surface 28 forming a ball seat or journal and on its other side, with a reduced stem portion 29, and is adapted to abut against said flange 25 with its stem 29 engaging in and forming a closure for the outer end of the lubricant reservoir member 23. The block 27 is provided with an axial opening 30 through which lubricant may pass from the reservoir onto the bearing surface 28 of said block.

Located in the outer portion of the enlarged end 13 is a movable socket block 31, having the concave bearing surface 32 for engaging the ball 19 in the usual manner. This block is provided with a stem, boss or centering projection 33. In order to cushion the movement of the rod or link in one direction, a spring 34 is provided which engages at one end about the boss 33 for positioning the block and abuts at its other end against the plug 15, as is usual in such constructions. The compression of the spring 34 may be adjusted to vary the clamping action of the blocks 27 and 31 on the ball 19 by means of the adjustable plug 15, as is well understood in the art.

The enlarged end 12 of the link is also provided with socket blocks 35 and 36, see Figure 2, which are adapted to engage the ball 19ª on the arm 20ª of the steering mechanism in a manner similar to the corresponding socket blocks 27 and 31 respectively at the other end of the link.

The socket block 35 is similar in construction to the block 31 and is interchangeable therewith. The projection 37 for positioning the block 35, however, is adapted to be seated in a recess 38 in the plug 16. The block 36 is provided with an elongated stem 39, the end of which is adapted to slidably engage the open end of the lubricant reservoir 24 and form a closure therefor. The block 36 and stem 39 are axially apertured to provide a passage 40 for conducting the lubricant from the reservoir 24 to the ball joint. A spring 41 corresponding to the spring 34 extending about the stem 39 and in engagement with the flange 26 is adapted to resiliently hold the block 36 in engagement with the ball 19ª on the arm 20ª. This arrangement of the spring permits a cushioning action in the opposite direction from that obtained by the spring 34, as is the common practice in such devices. The clamping action of the blocks may be varied by adjusting the plug 16.

Any suitable means may be provided for introducing the lubricant into the reservoirs. Heretofore, the conduits and passages for the lubricant have been made in the enlarged ends of the link. This arrangement, however, necessitates a special construction for the attachment of the grease cups, because the walls of the enlarged portions of the tube are not sufficiently thick to provide the necessary threaded surface, in order to properly support the grease cups. Moreover, where the grease cups are located on the enlarged portion of the link, they are limited to definite locations thereon due to the slots therein, and consequently the lubricant is not delivered directly to the bearing surfaces, but is delivered on those portions of the balls that are exposed to dirt, dust and grit.

In the present construction apertures 42, 43 are provided in the body portion of the link, the thickness of the wall of this portion of the tube being such as to afford a sufficient length for screw threads to retain the oil or grease conduits therein.

Any suitable lubricant conduits for conducting the lubricant to the reservoirs may be employed. As shown on the drawings, the usual oil or grease cups 44, 45 having their lower ends screw-threaded are secured in the apertures 42 and 43 for this purpose. The reservoirs are provided with apertures that register with the apertures in said body portion. If desired, these apertures may be also screw-threaded to engage the screw-threaded end of the oil cups; in such event the screw-threaded ends of the oil cups will assist in retaining the reservoirs rigidly in position in their seats within the body portion.

Attention is directed to the fact that by the use of lubricant reservoirs the grease cups may be located on the body portion of the link itself. This is an important feature of the invention because it permits the location of the grease cups at any point about the circumference of the link. Moreover, the passages through the wall of the link do not weaken the same because they occur at points where the reservoirs reinforce the link due to the frictional contact between the two. Moreover, by this arrangement the lubricant may be delivered directly to the bearing surfaces, thus insuring proper lubrication of those parts.

These apertures may be located at any convenient point about the circumference of the body portion of the link. They are preferably arranged on the top side of the link where access may be conveniently had to them, and where the grease cups 44, 45 screw-threaded therein may be out of the way and interfered with the least.

In Figure 4 is shown a modified form of lubricating device. This form differs from that shown in Figure 2, for instance, in that a wick 46 is employed in the passage 40 of the block 39 to conduct the lubricant from the reservoir 24 to the ball 19. The usual spring 47 for resiliently holding the wick against the ball 19 may be employed, if desired. The block 27 may also be provided with a similar arrangement if desired.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim:

1. In a device of the class described, a tubular body portion, a tubular end portion, a shoulder portion connecting said body and end portion, a bearing within said end portion, a thrust member recessed to form a lubricant reservoir closed at its inner end and extending into said body portion and means for conducting lubricant through the side walls of said body portion into the recess of said thrust member.

2. In a connecting link, a body portion, enlarged ends secured to said body portion, an abutment member forming a lubricant reservoir rigidly secured to said body portion and provided with a bearing located within one of said enlarged ends, substantially as shown and described.

3. In a connecting link, a tubular body portion, enlarged tubular end portions, tubular shoulder portions connecting said end portions to said body portion, said body portion being provided with a seat at each end thereof, and abutment members having their ends rigidly secured in said seats, bearings associated with said abutments, and located within said enlarged ends in spaced relation to said shoulders.

4. In a connecting link, a tubular body portion, enlarged tubular end portions, shoulders connecting said body and end portions, abutment members secured to said body portion and having bearings associated therewith located in said enlarged end portions, and lubricant reservoirs associated with said abutment members.

5. In a connecting link, a tubular body portion, tubular end portions secured to said body portion, shoulders connecting said body and end portions, tapered seats in said body portion, abutment members having tapered ends secured in said seats, said abutments free from said shoulders and provided with lubricant reservoirs therein, bearing members associated with said abutment members and provided with apertures in communication with said reservoirs, substantially as shown and described.

6. In a connecting link of the class described, a tubular body portion provided with tapered seats at each end thereof, enlarged tubular end portions, shoulder portions connecting said end portions to said body portion, abutment members having tapered stems frictionally secured in said tapered seats, bearing members associated with said abutment members for engaging balls associated with the steering mechanism of an automobile, said abutments provided with lubricant reservoirs having passages in communication with said bearings and lubricant members secured in the body portion of said link for conducting lubricant to said reservoir, substantially as shown and described.

In testimony whereof I affix my signature.

REYNOLD E. KLAGES.